United States Patent [19]

Relihan et al.

[11] Patent Number: 5,675,624
[45] Date of Patent: Oct. 7, 1997

[54] ADAPTIVE X-RAY BRIGHTNESS AND DISPLAY CONTROL FOR A MEDICAL IMAGING SYSTEM

[75] Inventors: Gary F. Relihan, Nashotah; Steven P. Roehm, Wauwatosa, both of Wis.; Ruchi Mangalik, Buffalo Grove, Ill.

[73] Assignee: General Electric Company, Milwaukee, Wis.

[21] Appl. No.: 572,414

[22] Filed: Dec. 14, 1995

[51] Int. Cl.$^6$ .................................................. H05G 1/64
[52] U.S. Cl. ................................... 378/98.7; 378/97
[58] Field of Search .................. 378/98.3, 98.2, 378/98.5, 98.7, 98.8, 98.12, 97

[56] References Cited

U.S. PATENT DOCUMENTS

| | | | |
|---|---|---|---|
| 4,590,603 | 5/1986 | Relihan et al. | 378/108 |
| 4,996,413 | 2/1991 | McDaniel et al. | 250/208.1 |
| 5,003,572 | 3/1991 | Meccariello et al. | 378/99 |
| 5,012,504 | 4/1991 | McFaul et al. | 378/98.7 |
| 5,319,696 | 6/1994 | Abdel-Malek et al. | 378/108 |
| 5,396,531 | 3/1995 | Hartley | 378/108 |
| 5,400,383 | 3/1995 | Yassa et al. | 378/98.2 |

*Primary Examiner*—Don Wong
*Attorney, Agent, or Firm*—Quarles & Brady

[57] ABSTRACT

An x-ray imaging system includes a source of x-rays, a video camera which produces an image signal formed by x-ray attenuation values, and image signal processor and a video monitor for displaying the x-ray image. The system also has an automatic image control that includes a peak detector, an average brightness detector and a transfer function generator for the image processor. The peak detector receives the image signal and produces a video gain control signal for controlling the video camera in response to a comparison of a peak level of the image signal to a peak reference level. The average the brightness detector employs the image signal to produce a feedback signal which controls by the source of x-rays. The transfer function generator produces a histogram of intensity levels in the image signal which histogram forms a look-up table that is used by the image processor to transform the image signal into the adjusted image signal for display.

19 Claims, 3 Drawing Sheets

ADAPTIVE X-RAY BRIGHTNESS AND DISPLAY CONTROL FOR A MEDICAL IMAGING SYSTEM

BACKGROUND OF THE INVENTION

The present invention relates to x-ray imaging apparatus, and more particularly to automatic exposure and brightness control for such imaging apparatus.

X-ray imaging equipment are well known medical diagnostic tools. One type of x-ray system is shown in FIG. 1 and comprises an x-ray tube 12 which produces a beam of x-rays that passes through a collimator 14 and thereafter is directed through a patient 16 being examined. The x-rays transmitted through the patient impinge upon an image intensifier tube 18 which converts the x-rays into a visible light image that is focused by an objective lens 20 through an optical aperture stop 22 onto a video camera 24. The video camera produces a standard video signal that is applied to a conventional image processor 26 which provides noise reduction, feature smoothing, edge enhancement and peak suppression to enhance image presentation on a monitor 28.

Depending upon the density of the portion of the patient being imaged, x-ray dosage and other factors, the brightness of the video image displayed on monitor 28 can vary markedly. Therefore, most x-ray systems incorporate an automatic brightness control 30 such as that described in U.S. Pat. No. 4,573,183. The automatic brightness control 30 derives the average brightness of the image from the video signal. That average brightness information is used to produce a video gain signal for controlling the camera 24 and to produce a brightness feedback signal that controls an x-ray tube power supply 32. In response to the brightness feedback signal, the x-ray tube power supply 32 produces a bias voltage and filament current for the x-ray tube 12 and thus varies the intensity of the x-ray beam to regulate brightness of the x-ray image formed by the image intensifier tube 18. By varying the gain or the aperture of video camera 24 the image brightness on monitor 28 also is controlled. Thus, the feedback provided by automatic brightness control 30 modifies the x-ray emission and camera gain which affect the image brightness in a known fashion and the feedback control can be calibrated to produce consistent image display brightness regardless of changes in patient x-ray absorption.

The standard automatic brightness control 30 derives the video gain and brightness feedback signals from a common average brightness value for the image. However, it has been determined that a common brightness feedback signal results in less than ideal control of these system parameters which affect the image produced on monitor 28.

SUMMARY OF THE INVENTION

A general object of the present invention is to provide an adaptive brightness control system which provides independent control of the x-ray dose, video dynamic range and display amplitude.

Another object of the present invention is to provide such independent control of the three functions by sampling a common image signal.

A further object of the present invention is to control image display quality with adaptive histogram processing.

Yet another object of the present invention is to provide independent control of the x-ray dose, video signal current level and display amplitude through decoupled adaptive control functions.

An exemplary x-ray imaging system, in which the present invention may be incorporated, includes a source of x-rays, a detector with a video camera which produces an image signal formed by attenuated x-rays, and a video monitor which converts the image signal into a video image. The novel automatic brightness control comprises a transfer function generator which receives the image signal and produces a set of values therefrom which define an image transfer function. In the preferred embodiment the transfer function generator creates a histogram from the image intensity levels of the image signal. The preferred transfer function generator integrates the histogram and then scales the intensity level counts in the integrated histogram to a predefined range of values thereby producing a scaled histogram. The predefined range corresponds to the intensity level range of the image signal. The values in the scaled histogram define the image transfer function.

An image processor applies the defined image transfer function to the image signal to produce an adjusted image signal for display on the video monitor. Preferably, the scaled histogram is stored as a look-up table for transforming the intensity level of each picture element in the image signal into transformed picture elements of the adjusted image signal.

DETAILED DESCRIPTION OF THE INVENTION

Figure 1:
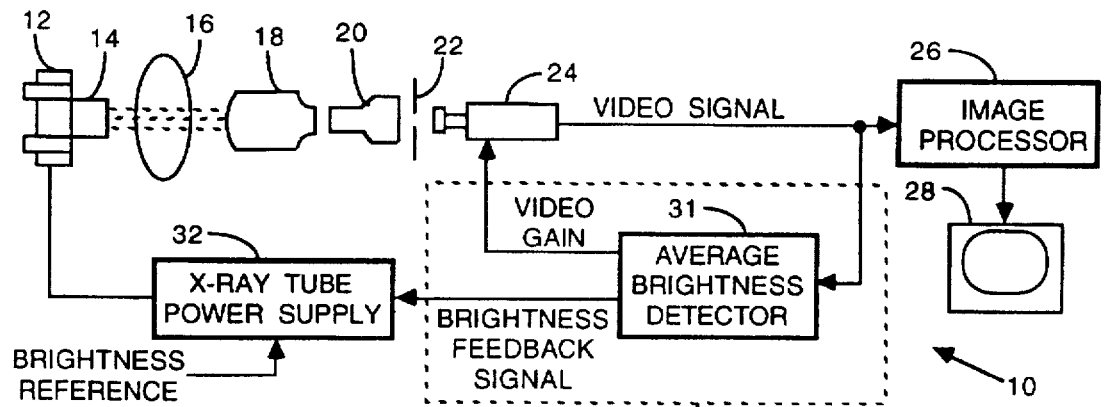
FIG. 1 is a block diagram of a prior art x-ray imaging system with automatic brightness control.
Figure 2:
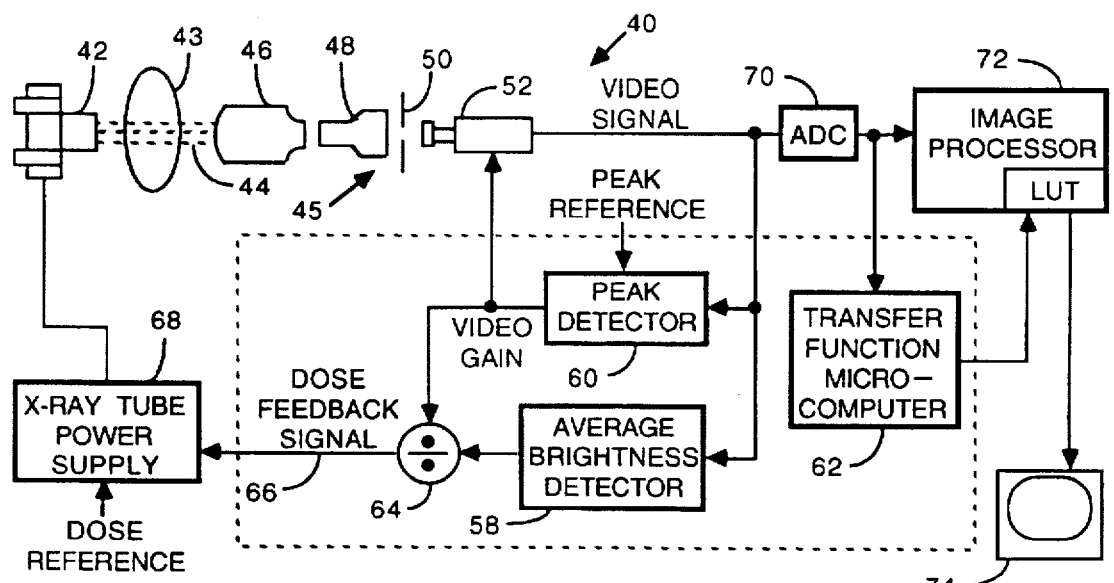
FIG. 2 is a block diagram of an x-ray imaging system that incorporates an improved automatic brightness control according to the present invention.

With reference to FIG. 2, an x-ray imaging system 40 incorporating the present invention has an x-ray source 42 having a conventional vacuum tube and collimator which produce an x-ray beam 44 directed through a patient 43. The x-ray beam passes through the patient's body being attenuated by different anatomical structures. The exiting beam impinges upon an image intensifier 46 which converts the attenuated x-rays into a visible light image that is received by an x-ray detector assembly 45. The detector assembly 45 has an objective lens 48 that focuses the image through aperture 50 into a video camera which produces an analog video signal representing an image formed by the attenuated x-rays. The analog video signal on line 54 is converted into a series of N-bit (e.g. 8-bit) digital picture elements, or pixels, by an analog-to-digital (A/D) converter 70 and the digitized signal is processed by image processor 72 to enhance the image quality before being displayed on monitor 74.

The video signal from camera 52 also is applied to an input of an adaptive brightness control circuit 56 which has three principal subsystems: an average brightness detector 58, a peak signal detector 60 and a transfer function microcomputer 62. The peak detector 60 controls the video gain of camera 52 in a manner which places the peak video signal at or near the maximum signal amplitude capability of analog-to-digital converter 70. This function ensures that the video signal is stretched to the full dynamic range of the digital signal processing while preventing the peak video level from saturating A/D converter 70.

Specifically, the peak detector 60 determines the peak, or highest, level of the video signal and then compares that peak level to a peak reference level which corresponds to the maximum amplitude which can be handled by the A/D converter 70. The peak detector may comprise a diode which charges a capacitor with the capacitor voltage representing the peak level. The result of the comparison to a reference level produces a video gain signal for controlling the amplification gain and optical aperture size of the camera 52. If the peak level of the video signal is less than the peak reference level, the video gain will be increased or, alternatively, a video aperture is opened in order to bring the peak video level to the maximum permitted value. Similarly, if the peak video signal level is above the capability of the A/D converter 70, the peak detector 60 decreases the video gain or closes down the video aperture to bring the peak video level to the maximum level. This control of the video camera gain is carried out independently of other control functions implemented by the average brightness detector 58 which regulates the x-ray dose and the transfer function microcomputer 62 which defines image display characteristics.

The average brightness detector 58 produces a control signal that regulates the amount of radiation emitted by the source 42, i.e. the x-ray dose, to create the x-ray image. The average brightness detector 58 is similar to brightness control circuits used in previous x-ray systems, such as that described in U.S. Pat. No. 4,573,183, the description in which is incorporated herein by reference. Specifically, the average brightness detector 58 has a sensing window which defines an area within the image and the brightness of pixels within that defined image area are averaged. This produces a feedback signal representing the brightness of an object of interest being imaged which typically if located within the detection window. In the present system 40, the average brightness feedback signal is applied to the numerator input of a divider 64. The denominator input of divider 64 receives the video gain signal produced by peak detector 60 and produces a quotient on line 66 which is designated as the "dose feedback signal."

The dose feedback signal is applied as an input to an x-ray tube power supply 68 and regulates production of the bias voltage and filament current for the x-ray source 42. The x-ray tube power supply 68 also receives a dose reference level set during system calibration for a given x-ray dose selection. If the dose feedback signal is greater than the dose reference level, the x-ray tube power supply by reducing the radiation intensity. Correspondingly, when the dose feedback signal is less than the dose reference level, the x-ray tube power supply 68 increases the radiation dose produced by x-ray source 42 until the dose feedback signal equals the dose reference level. In this manner the average x-ray dose within the view of the detector 58 is maintained at the calibrated level. Division of the average brightness by the video gain in divider 64 prevents the effects of peak detector 60 on the video signal from altering the radiation dose, i.e. affecting the x-ray tube power supply 68.

The digitized video signal produced by the A/D converter 70 is fed to an image processor 72 similar to those used in previous x-ray imaging systems. However, in addition to providing noise reduction, feature smoothing, edge enhancement and peak suppression, image processor 72 also transforms the incoming digitized video image into an altered image having the enhanced brightness and contrast characteristics. The transfer function for this image transformation is provided by a look-up table 76 within the image processor 72. The digital value of each incoming image pixel is applied to the address input of the look-up table 76 and the value stored at the addressed location in the table becomes the altered value for that image pixel.

Figure 3:
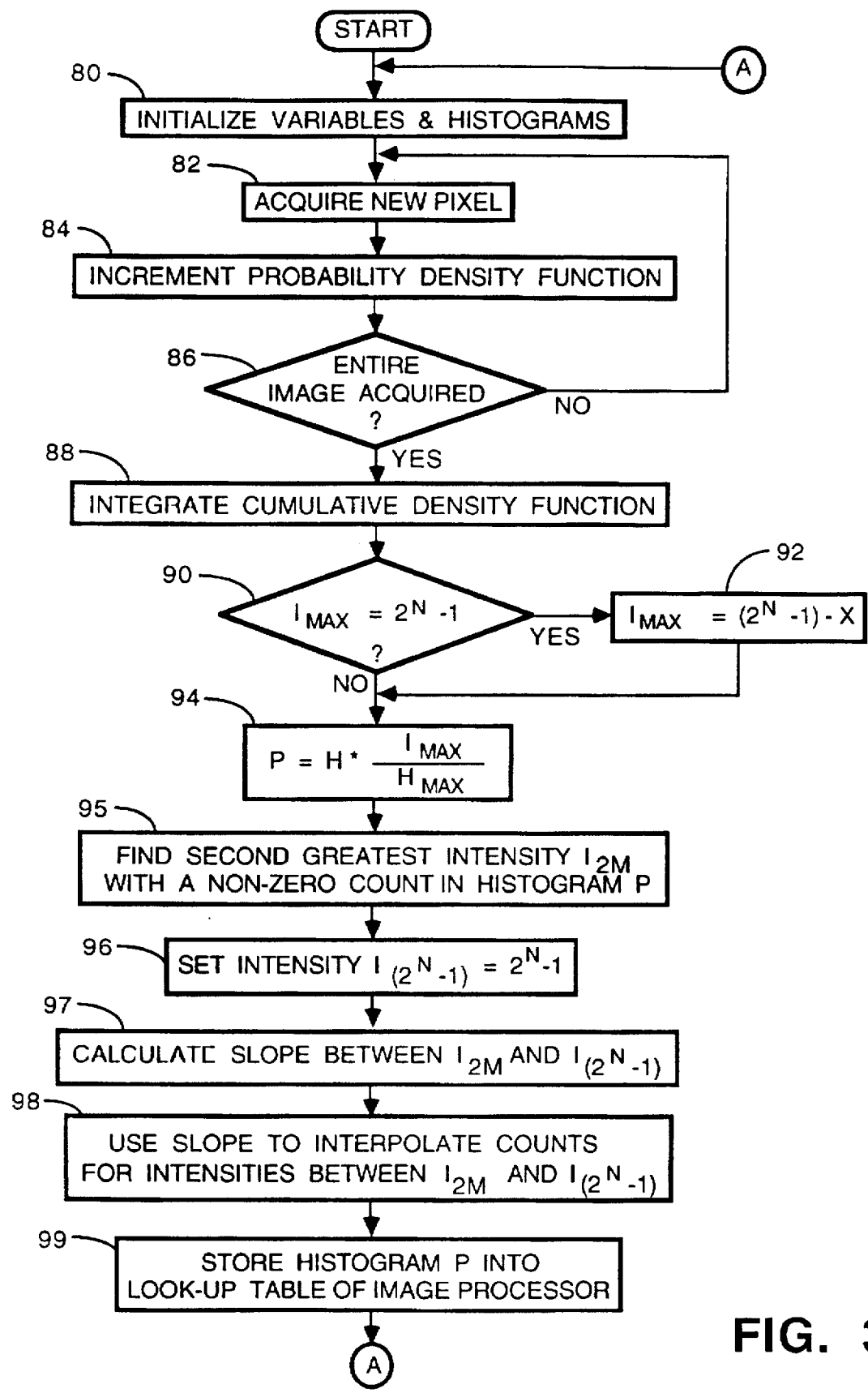
FIG. 3 is a flowchart of a signal processing routine executed by components of the improved automatic brightness control.

The look-up table 76 is generated by the transfer function microcomputer 62 within the automatic brightness control system 56. The transfer function microcomputer 62 is programmed to generate values for storage in the look-up table 76 within the image processor 72 which define a transfer function for transforming the digital image produced by A/D converter 70 into an image with enhanced brightness and contrast. The software routine for generating the look-up table is depicted in the flow chart of FIG. 3.

The routine is initialized at the beginning of each new image acquired by camera 52, e.g. a new video frame. At that time, the variables and histogram arrays utilized in the processing are initialized at step 80. The look-up table is formed by producing a histogram H which is a count of the number of pixels within the image at each pixel intensity value. Such a histogram can be depicted by a two dimensional graph having the pixel intensity values (e.g. 0 to $2^N-1$) along the horizontal axis and the count of pixels at each value along the vertical axis. As each pixel is received from the A/D converter 70 at step 82, the corresponding intensity element of the histogram H is incremented to show that one more pixel at that intensity level exists within the image. Then at step 86, a determination is made whether the entire image has been acquired and if not the program returns to step 82 to await another pixel from the A/D converter 70.

After all the pixels for an image have been acquired, the histogram H is integrated over the pixel intensities to produce a cumulative density function at step 88. The magnitude of the pixel counts at various intensity levels in the histogram can be in the thousands or tens of thousands. In order to convert the histogram into a look-up table which can be used to transform the video signal, the histogram counts must be scaled down to the intensity level range of the digital processing, for example 0 to $2^N-1$. At step 90 the maximum pixel intensity level $I_{MAX}$ existing in the present image is determined by finding the greatest pixel intensity level which has a non-zero count in the histogram H. If this maximum intensity level $I_{MAX}$ is not equal to the maximum value that can be produced by A/D converter 70 (e.g. $2^N-1$), the program execution branches to step 92 where that pixel intensity level is artificially set to a value less than $2^N-1$ (e.g. set to 240 when $2^N-1=255$) for further processing purposes. In either event, the program execution ultimately advances to step 94 where a scaled histogram, designated P, is produced by multiplying each intensity level count in the original histogram H by the maximum intensity level, $I_{MAX}$, divided by the maximum histogram count, $H_{MAX}$. This action at step 94 scales the histogram counts to values between zero and $2^N-1$ which is the maximum digital value that can be produced by the A/D converter in the exemplary imaging system 40. Thus, the scaled histogram P is a two dimensional array that is stored in the memory of transfer function microcomputer 62.

Figure 4A:
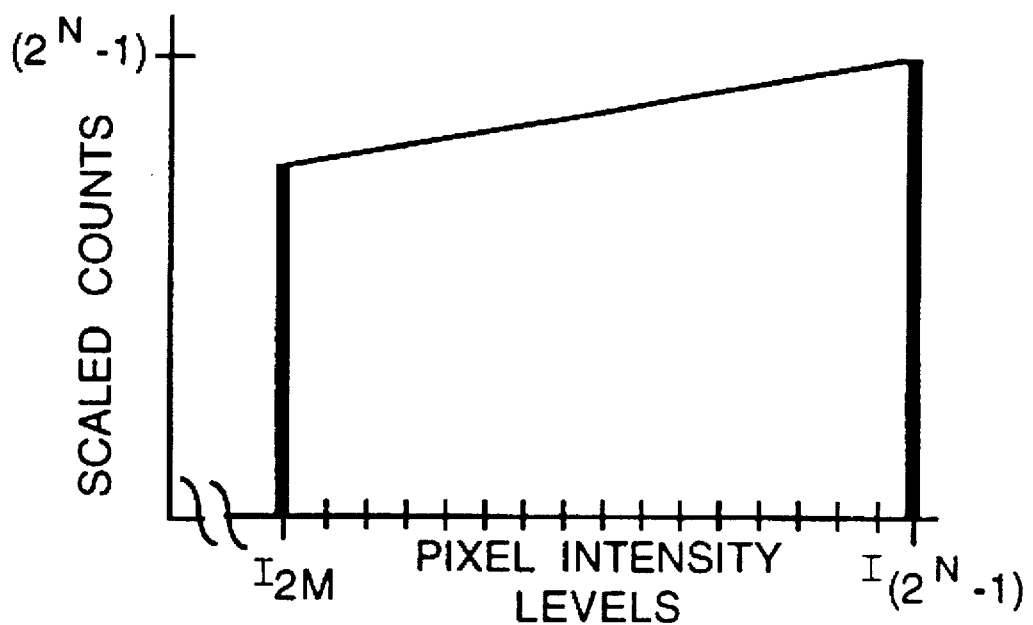
FIG. 4a–b illustrate a portion of a histogram produced by execution of the signal processing routine.
Figure 4B:
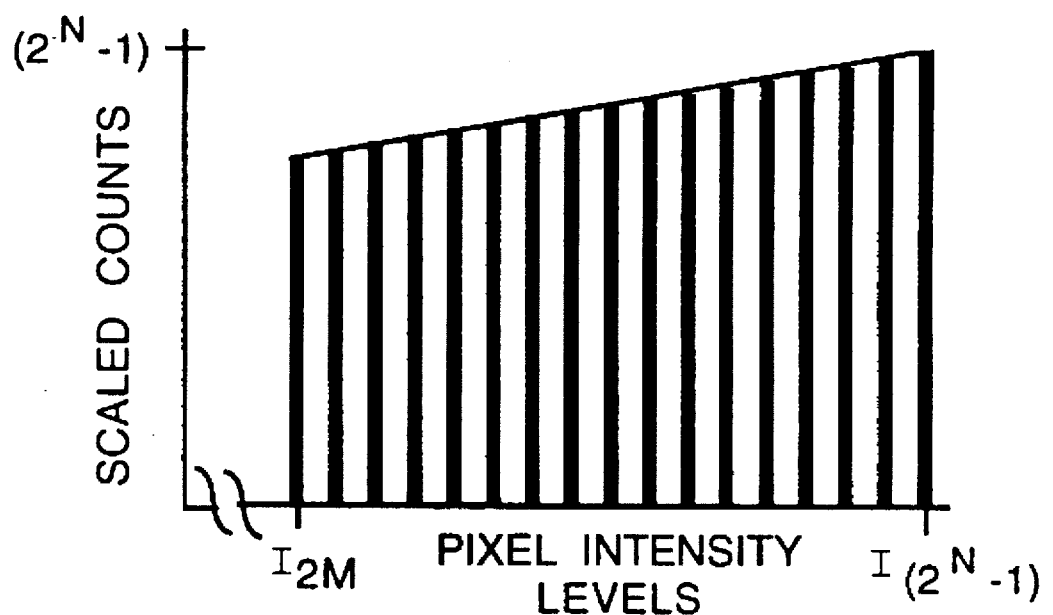

Next the program execution by the transfer function microcomputer 62 advances to step 95 where the location of the second greatest pixel intensity level $I_{2M}$ with a non-zero count is found. Then the maximum pixel intensity level $I_2^N{_{-1}}$ within the scaled histogram P is set to the maximum scaled count value, $2^N-1$, at step 96 as shown graphically in FIG. 4a. Thereafter at step 97, the transfer function microcomputer 62 calculates the slope between the located second greatest pixel intensity level $I_{2M}$ and the maximum intensity level $I_2^N{_{-1}}$. This slope can be calculated accordingly to the expression:

$$\text{SLOPE} = \frac{(2N-1) - P(I_{2M})}{(2N-1) - I_{2M}}$$

where $P(I_{2M})$ is the scaled count for the second greatest pixel intensity level $I_{2M}$. The slope is employed at step 98 to interpolate counts for pixel intensities in the scaled histogram P between the intensities $I_{2M}$ and $I_2^N{_{-1}}$ as depicted in FIG. 4b. This provides a straight curve in the scaled histogram P between those two pixel intensity values.

This action culminates the derivation of the scaled histogram which is transferred from the transfer function microcomputer 62 in the adaptive brightness control circuit 56 to form the look-up table 76 within the memory of the image processor 72.

Thereafter, the image processor 72 utilizes the look-up table 76 to transform the previously stored digitized pixels of the image. Specifically, each raw digital pixel as produced by the A/D converter 70 is used as an address of the look-up table and the corresponding value at that address (i.e. The scaled histogram count) becomes that pixel's transformed intensity for further image processing prior to display on monitor 74. In graphical terms, the raw pixel intensity level locates a position along the horizontal axis of the scaled histogram P, and the pixel count at that pixel intensity level in the histogram becomes the new intensity value for that pixel.

We claim:

1. An automatic brightness control for an x-ray imaging system having a source of x-rays, a detector having a video camera which produces an image signal formed by attenuated x-rays, and a video monitor which converts the image signal into a video image; the automatic brightness control comprising:
a peak detector receiving the image signal and producing a video gain signal in response to a comparison of a peak level of the image signal to a peak reference level, wherein the video gain signal is applied to control the video camera;
an average brightness detector receiving the image signal and producing an output signal which represents an average brightness level for the image signal and wherein the output signal is employed to control the source of x-rays;
a transfer function generator which receives the image signal and produces a set of values which defines an image transfer function; and
an image processor which receives the set of values from said transfer function generator and applies the image transfer function to the image signal.

2. The automatic brightness control as recited in claim 1 wherein said transfer function generator comprises a processor for deriving the image transfer function from a histogram of image intensity levels in the image signal.

3. The automatic brightness control as recited in claim 1 wherein said transfer function generator comprises a histogram generator which produces a histogram of a plurality of image intensity levels of the image signal.

4. The automatic brightness control as recited in claim 3 wherein said transfer function generator further comprises an integrator for integrating the histogram to produce a cumulative density function.

5. The automatic brightness control as recited in claim 4 wherein said transfer function generator further comprises an scaler which responds to the integrator by scaling counts in the integrated histogram to a predefined range of values to produce a scaled histogram.

6. The automatic brightness control as recited in claim 5 wherein said transfer function generator further comprises extrapolating the scaled histogram to a maximum value within the plurality of image intensity levels of the image signal.

7. The automatic brightness control as recited in claim 2 wherein said image processor stores the histogram of image intensity levels created by said transfer function generator.

8. The automatic brightness control as recited in claim 1 further comprising a compensator which removes effects of the video gain signal from production of the output signal by the average brightness detector.

9. The automatic brightness control as recited in claim 8 wherein said compensator comprises a divider which divides the video gain signal into the output signal from said average brightness detector to produce a dose feedback signal which controls emission of x-rays by the source of x-rays.

10. An automatic brightness control for an x-ray imaging system having a source of x-rays, a detector having a video camera which produces an image signal formed by attenuated x-rays, and a video monitor which converts the image signal into a video image; the automatic brightness control comprising:
a transfer function generator coupled to the video camera for receiving the image signal and producing a set of values which define an image transfer function, said transfer function generator comprising a processor for deriving the image transfer function from a histogram of image intensity levels in the image signal; and
an image processor which applies the image transfer function to the image signal to produce an adjusted image signal for display by the video monitor.

11. The automatic brightness control as recited in claim 10 further comprising an average brightness detector receiving the image signal and producing a dose feedback signal for controlling emission by the source of x-ray.

12. The automatic brightness control as recited in claim 10 wherein said transfer function generator comprises a histogram generator which produces a histogram of a plurality of image intensity levels of the image signal.

13. The automatic brightness control as recited in claim 12 wherein said transfer function generator further comprises an integrator for integrating the histogram to produce an integrated histogram.

14. The automatic brightness control as recited in claim 13 wherein said transfer function generator further comprises an scaler which responds to the integrator by scaling counts in the integrated histogram to a predefined range of values to produce a scaled histogram.

15. The automatic brightness control as recited in claim 14 wherein said transfer function generator further comprises an extrapolator which extrapolates the scaled histogram from a given image intensity level to a predefined maximum intensity level for the scaled histogram.

16. The automatic brightness control as recited in claim 10 wherein said image processor stores the histogram of image intensity levels created by said transfer function generator.

17. The automatic brightness control as recited in claim 10 further comprising a peak detector which receives the image signal and producing a video gain signal in response to a comparison of a peak level of the image signal to a peak reference level.

18. The automatic brightness control as recited in claim 17 further comprising an average brightness detector receiving the image signal and producing an output signal for controlling emission by the source of x-rays.

19. The automatic brightness control as recited in claim 18 further comprising a divider which divides the video gain signal into the output signal from said average brightness detector to produce a dose feedback signal which controls emission of x-rays by the source of x-rays.

* * * * *